United States Patent
Aono et al.

(10) Patent No.: US 6,861,096 B2
(45) Date of Patent: Mar. 1, 2005

(54) METHOD FOR PRODUCING A CERAMIC BODY DECORATED WITH AN INORGANIC PIGMENT

(75) Inventors: Toshiaki Aono, Shizuoka-ken (JP); Akio Miyamoto, Shizuoka-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/442,229

(22) Filed: May 21, 2003

(65) Prior Publication Data

US 2003/0207041 A1 Nov. 6, 2003

Related U.S. Application Data

(63) Continuation-in-part of application No. 09/855,017, filed on May 15, 2001, now abandoned.

(30) Foreign Application Priority Data

May 15, 2000 (JP) ........................................ 2000-141639
May 16, 2000 (JP) ........................................ 2000-143304

(51) Int. Cl.[7] ................................................ B05D 5/00
(52) U.S. Cl. ..................... 427/261; 427/145; 427/146; 427/149; 427/226; 427/421; 427/422
(58) Field of Search ............................... 427/145, 146, 427/147, 148, 226, 258, 261, 287, 372.2, 376.2, 421, 422

(56) References Cited

U.S. PATENT DOCUMENTS 5,409,883 A  *  4/1995  Larshus et al. ............. 503/227
5,418,041 A  *  5/1995  Kent et al. ................. 428/195.1
5,432,258 A  *  7/1995  Yoshimura ................ 428/32.79
5,643,380 A  *  7/1997  Saitoh et al. .................. 156/94
6,149,747 A     11/2000  Lorenz et al.
6,336,723 B1    1/2002  Nicolin

FOREIGN PATENT DOCUMENTS

| EP | 1 022 157 A2 | * | 7/2000 | ............ B44C/1/17 |
| GB | 2 085 459 A |   | 4/1982 | |
| JP | 04-214391 |   | 8/1992 | |
| JP | 04-219294 A | * | 8/1992 | ............ B41M/5/40 |
| JP | 06-166298 |   | 6/1994 | |
| JP | 06-166298 A | * | 6/1994 | ............ B44C/1/17 |
| JP | 07-228035 |   | 8/1995 | |
| JP | 07-228035 A | * | 8/1995 | ............ B41M/1/34 |
| JP | 11-048694 A | * | 2/1999 | ............ B44C/1/17 |
| WO | WO-96/33446 A1 | * | 10/1996 | ............ G03G/9/12 |
| WO | WO 98/49013 A1 |   | 11/1998 | |

OTHER PUBLICATIONS

Definition of "ceramic" from Hawley's Condensed Chemical Dictionary, 12th Edition, © 1993 by Van Nostrand Reinhold, Richard J. Lewis, Sr., Editor, p. 240.

* cited by examiner

Primary Examiner—Shrive P. Beck
Assistant Examiner—William Phillip Fletcher, III
(74) Attorney, Agent, or Firm—Sughrue Mion, PLLC

(57) ABSTRACT

A method for producing a painted ceramic body. A transfer material containing an inorganic pigment, or hot melt ink containing an inorganic pigment is directly or indirectly disposed on the surface of a ceramic body in an imagewise manner. Subsequently, the ceramic body with the image formed thereon is heated and the inorganic pigment contained in the image is sintered on the surface of the ceramic body.

20 Claims, 5 Drawing Sheets

METHOD FOR PRODUCING A CERAMIC BODY DECORATED WITH AN INORGANIC PIGMENT

CROSS-REFERENCE TO RELATED APPLICATIONS

This application is a Continuation-in-Part of U.S. patent application Ser. No. 09/855,017 on filed May 15, 2001 abandoned, the entire disclosure of which is incorporated herein by reference. U.S. patent application Ser. No. 09/855,017 claims priority from Japanese Patent Application No. 2000-141639, filed on May 15, 2000, and Japanese Patent Application No. 2000-143304, filed on May 16, 2000.

BACKGROUND OF THE INVENTION

1. Field of the Invention

The present invention relates to a method for producing a painted ceramic body. More specifically, it relates to a simplified method for producing a painted ceramic body which can be used as building materials such as art tiles, ceramic photographs, and the like.

2. Description of the Related Art

It has been expected that a painted ceramic body in which a black and white image or a color image is formed on a ceramic body such as a ceramic plate, would be used for various purposes, for example, not only for building materials such as art tiles used for walls of a bathroom or an entrance hall, but also for ceramic photographs such as portraits or funeral pictures, and accessories such as pendants or brooches. As a method for forming an image on the surface of a ceramic plate or the like, a method has conventionally been known, wherein after an image is formed on an ordinary photographic printing paper, a paper region of the photographic printing paper is removed and an image region is adhered to the surface of ceramic, and the surface of the image region is laminated with ultraviolet curing resin to allow protection of the image region. However, an image formed by this method does not have sufficient light resistance and heat resistance in an image region thereof. Accordingly, an image having excellent light resistance and heat resistance and which could be preserved semipermanently, would be advantageous in that the range of use for such ceramic bodies would be increased.

For example, Japanese Patent Application Laid-Open (JP-A) No. 2-252683 discloses a method in which a photosensitive film is adhered to the surface of ceramic and subjected to dot exposure through a color-separated lithographic film, and thereafter, this film is developed and the ceramic is calcined in such a manner that painting inorganic pigments for painting are sequentially placed thereon in accordance with a developed image. Further, JP-A No. 62-246887 discloses a method in which a photosensitive polymer is used in place of the above-described photosensitive film and directly applied onto ceramic and subjected to dot exposure, and thereafter, the polymer is subjected to development processing, and the ceramic is calcined with a pigment image formed thereon in such a manner as described above. Images (ceramic photographs) formed by the above-described methods each have extremely excellent preservability and can be semipermanently preserved. However, when the above-described methods are used, it is necessary to prepare a plurality of lithographic films into which a color image is separated for each color. Further, it is necessary to closely adjust an amount of the pigment when the pigment is applied to the surface of a developed photosensitive film. There are many cases in which the preparation of the film needs be repeatedly carried out due to poor reproducibility. Moreover, formation and calcination of each pigment layer need to be carried out repeatedly. Accordingly, the above-described methods each have a problem in that the operation is remarkably complicated and the production cost is high.

Furthermore, another method is also proposed, wherein printing using ink containing a painting pigment as a main component, is carried out on a transfer paper (a paper substrate on which a water-soluble polymer such as dextrin is coated) by screen printing or gravure printing, a cover coat resin (a hydrophobic polymer) is overcoated thereon, and the transfer paper is adhered to ceramic and calcined. An image formed by this method also has excellent durability and can be semipermanently preserved in the same manner as the above-described methods. However, in this case as well, it is necessary to prepare a plurality of lithographic films having the respective colors of the image and planographic printing plates, and formation and calcination of a pigment image need to be repeatedly carried out. Accordingly, this method also has the same problem as that of the above-described methods in that the operation is remarkably complicated and the manufacturing cost is high. Further, the painting pigment is apt to cause clogging of meshes of a screen, and meshes of the screen cannot be made sufficiently small. As a result, there exists a problem in that an image like a sharp photograph having an excellent resolution is difficult to reproduce.

In view of the conventional production methods involving complicated procedures and high costs, the inventor disclosed a production method which can be conducted readily and at low costs in JP-A No. 6-166298. This method comprises the steps of transferring a pigment image onto a thermally transferrable image receiving sheet for ceramics ("thermally transferrable film") in accordance with image information using a thermally transferrable printer by which a thermally transferrable image donating sheet (ink sheet) having a hot melt image donating layer (ink layer) containing a painting pigment is used, adhering the sheet to a ceramic body, and sintering the ceramic body to thereby form a ceramic image on the ceramic body. This method made it possible to produce the painted ceramic body in a simple manner and at low costs since color images could directly be formed on an image receiving sheet or a transfer paper in accordance with the digital data without using the planographic printing plate and the lithographic film. This method, however, requires preparation of the image donating sheet, in which the image donating layer containing the painting inorganic pigment and a hot melt binder on a thin film has been coated, in the form of a roll (a state where a longitudinal sheet is rolled) beforehand, such that the inorganic pigment image can be transferred to an image receiving paper using a commercially available thermosensitive transferrable printer. Furthermore, in order to form an image containing two or more colors, this method requires preparation of the image donating sheet, on which respective color ink layers have been successively disposed, in the form of a roll. From the foregoing, the kinds of usable pigments are limited in view of the appointed date of delivery and costs.

Another method disclosed in JP-A No. 6-166298 has a drawback in that two or more kinds of pigments cause discoloration through co-melting to thus fail in color reproduction. In order to avoid such a phenomenon, the inventor disclosed a method which comprises placing pigments that possibly produce such a phenomenon onto separate thermally transferrable image receiving sheets for ceramics ("thermally transferrable film"), adhering the respective sheets to the ceramic body and sintering the ceramic body to thereby alleviate the degree of discoloration. However, this method also requires preparation of the image donating sheet, in which the image donating layer containing the painting inorganic pigment and a hot melt binder on a thin film has been coated, in the form of a roll (a state where a longitudinal sheet is rolled) beforehand, such that the inorganic pigment image can be transferred to a image receiving paper using a commercially available thermosensitive transferrable printer, and further, preparation of the image donating sheet beforehand, on which respective color image donating layers have been successively disposed, in the form of a roll. From the foregoing, the kinds of usable pigments are limited in view of the appointed date of delivery and costs.

Moreover, in order that an image having excellent preservability be formed on a ceramic body, it is necessary to sinter on a ceramic body an image comprised of an inorganic pigment, and also select an image forming method suitable for the characteristics of inorganic pigment.

SUMMARY OF THE INVENTION

It is an object of the present invention to provide a method in which a painted ceramic body having excellent image preservability can be produced by a simple process in a stable manner and at a low cost.

It is another object of the present invention to provide a method for producing a painted ceramic body by use of preferred pigments, that can be conducted readily and inexpensively and advance the appointed date of delivery.

Means for solving the above-described object will be described hereinafter.

A first aspect of the present invention is a method for producing a painted ceramic body, which comprises the steps of: spraying or ejecting hot melt ink including an inorganic pigment to cause ink droplets to fly in an imagewise manner onto an image receiving sheet, and forming an image comprised of the ink on the image receiving sheet; disposing the image formed on the image receiving sheet, on a surface of a ceramic body together with at least a part of the image receiving sheet; and sintering the inorganic pigment included in the ink, to the surface of the ceramic body by heating the ceramic body.

A second aspect of the present invention is a method for producing a painted ceramic body, which comprises the steps of: preparing an image donating sheet including an image donating layer which is comprised of a painting inorganic pigment and a binder and/or a hot melt organic substance, and an image receiving sheet comprising an image receiving layer to which the image donating layer is transferrable in an imagewise manner; forming a latent image by applying in an imagewise manner a transfer accelerating material, which accelerates transfer of the image donating layer to the surface of the image receiving layer, to at least one of the surface of the image donating layer of the image donating sheet and the surface of the image receiving layer of the image receiving sheet; transferring the image donating layer corresponding to the latent image, to the surface of the image receiving layer with at least the surface of the image donating layer and the surface of the image receiving layer contacting each other, and peeling the image donating sheet away, thereby forming an image comprised of the image donating layer on the surface of the image receiving layer; disposing the image comprised of the image donating layer on the surface of the ceramic body together with at least a part of the image receiving sheet; and sintering the inorganic pigment included in the image donating layer on the surface of the ceramic body by heating the ceramic body.

A third aspect of the present invention is a method for producing a painted ceramic body, which comprises the steps of: preparing an image donating sheet having an image donating layer which is comprised of a painting inorganic pigment and a binder and/or a hot melt organic substance, and a ceramic body having an image receiving layer to which the image donating layer is transferrable; forming a latent image by applying in an imagewise manner a transfer accelerating material, which accelerates transfer of the image donating layer to the surface of the image receiving layer, to at least one of the surface of the image donating layer of the image donating sheet and the surface of the image receiving layer; transferring the image donating layer corresponding to the latent image, to the surface of the image receiving layer with at least the surface of the image donating layer and the surface of the image receiving layer contacting each other, and peeling the image donating sheet away, thereby forming an image comprised of the image donating layer on the surface of the image receiving layer; and sintering the painting inorganic pigment on the surface of the ceramic body by heating the ceramic body.

A fourth aspect of the present invention is a method for producing a painted ceramic body as defined in the second aspect, in which the step of forming a latent image by applying in an imagewise manner a transfer accelerating material to at least one of the surface of the image donating layer and the image receiving layer comprises forming the latent image by forming a toner image onto the at least one of the surface of the image donating layer and the image receiving layer using an electrophotographic printer.

A fifth aspect of the present invention is a method for producing a painted ceramic body as defined in the third aspect, in which the step of forming a latent image by applying in an imagewise manner a transfer accelerating material to at least one of the surface of the image donating layer and the image receiving layer comprises forming the latent image by forming a toner image onto the at least one of the surface of the image donating layer and the image receiving layer using an electrophotographic printer.

In the method for producing a painted ceramic body according to the present invention, no production of lithographic films or the like is required at the time of image formation, and a painted ceramic body can be produced by a simple process at a low cost. In the first aspect of the present invention, an image is formed by using a hot melt ink jet system. In the hot melt ink, a medium in which coloring materials are dispersed, is a material such as wax, which is in solid form at ordinary temperatures. Even if an inorganic pigment having a relatively large specific gravity is used, sedimentation of the inorganic pigment can be reduced. Further, in the third to fifth aspects of the present invention, image formation is carried out after a latent image forming step in which a latent image is formed by using a transfer accelerating material. Therefore, it is not necessary to use an ink in which an inorganic pigment having a relatively large specific gravity is dispersed in a water based medium or the like, and no sedimentation or the like of the inorganic pigment is caused. As described above, in the present invention, an image can be stably formed. Moreover, the inorganic pigment forming an image is sintered on the surface of the ceramic body, and therefore, the image thus formed has high preservation stability.

DESCRIPTION OF THE PREFERRED EMBODIMENTS

Definitions

Figure 1A:
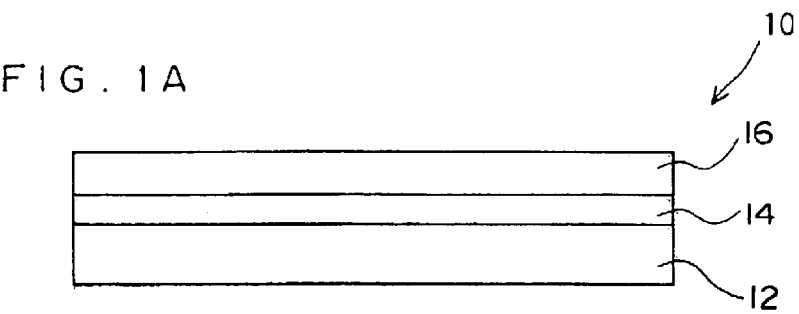
FIGS. 1A to 1D are schematic diagrams for illustrating an embodiment according to a first aspect of the present invention.

"Image donating substance" as used herein refers to a painting inorganic pigment such as a metal oxide, a metal complex or the like.

"Image donating layer" as used herein refers to a layer containing an image donating substance and further, as the additive, a binder, a wax, a dispersant or the like. This term may be referred to as a "transfer layer" or an "ink layer".

"Image donating sheet" as used herein refers to a sheet comprising a thin film having disposed thereon at least an image donating sheet. This term may be referred to as a "transfer sheet" or an "ink sheet".

"Ink" as used herein refers to a dispersion containing a pigment, a binder, a wax and the like, which is liquid at an ordinary temperature or under heating conditions.

"Transfer paper" usually refers to a material comprising a paper substrate having disposed thereon a water-soluble polymer layer. A transfer image is formed by transferring thereon the image drawn with an ink containing an image donating substance or the image donating layer in an imagewise manner. Further on this, a cover coat resin (also called an "overcoat resin", a hydrophobic polymer) is coated and the resultant product is immersed in water to dissolve the hydrophobic polymer such that the image and the covercoat resin can be peeled from the paper substrate, and the peeled product is adhered to the surface of the ceramic body, then dried and sintered to thereby form a ceramic image. Alternatively, a hydrophobic polymer layer is coated on the water-soluble polymer layer of the transfer paper beforehand, and the image is formed or transferred thereon. This method is advantageous from the standpoints of costs and working ability since application of the hydrophobic polymer layer can be conducted in a large amount using a coating machine.

"Image receiving layer" as used herein refers to a layer that is designed to allow transferring of the image donating layer in an imagewise manner. Use of this layer makes the water-soluble polymer layer or the hydrophobic polymer layer to act as the image receiving layer.

"Image receiving sheet" as used herein refers to a sheet comprising a film or a paper substrate having disposed thereon the above-described image receiving layer. Use of this sheet makes the transfer paper to act as the image receiving sheet.

First, a description will be given of the first aspect of the present invention.

A first aspect of a method for producing a painted ceramic body according to the present invention comprises: a step in which energy is supplied to hot melt ink containing an inorganic pigment, and ink droplets are made to fly (sprayed or ejected) onto an image receiving sheet in an imagewise manner to allow an image comprised of the above-described ink to be formed on the image receiving sheet (hereinafter referred to as "ink image forming step"); a step in which the image formed on the image receiving sheet is disposed on the surface of a ceramic body together with all or a part of the image receiving sheet (hereinafter referred to as "image disposing step"); and a step in which the ceramic body on which the above-described image is disposed, is heated so that the inorganic pigment contained in the transfer image can be sintered on the surface of the ceramic body (hereinafter referred to as "image sintering step").

A painted ceramic body produced by the present invention is structured in such a manner that an inorganic pigment which forms an image portion, is sintered on the surface of a ceramic plate. Therefore, the heat resistance, water resistance, and light resistance of the painted ceramic body are all excellent, and high preservability is also obtained. Further, a hot melt ink jet process is used for forming an ink image on the ceramic body, and therefore, even when a color image is formed, no complicated process is required and a painted ceramic body can be produced in a simple and stable manner and at a low cost.

Next, a description will be given of an embodiment of the present invention with reference to the attached drawings.

Figure 1B:
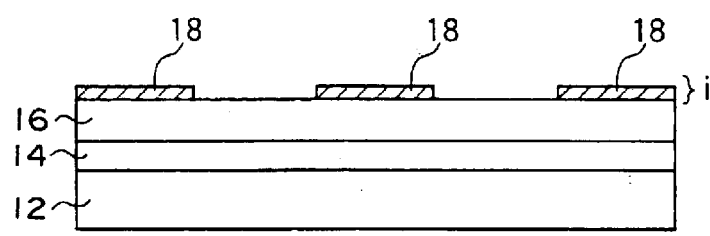

First, an image receiving sheet 10 is prepared (see FIG. 1A). The image receiving sheet 10 has a structure in which a layer 14 comprised of a water-soluble polymer is formed on a paper substrate 12 and a layer 16 comprised of a hydrophobic polymer is formed on the layer 14. The image receiving sheet 10 is structured in such a manner that a water-soluble polymer in the layer 14 can be dissolved by immersing at least the layer 14 in water to peel the layer 16 from the substrate 12, and the layer 16 peeled from the substrate 12 can be made adherent to the surface of a ceramic plate by a partially dissolved water-soluble polymer in the layer 14. Subsequently, the image receiving sheet 10 is set in an ink jet printer (not shown), and energy is supplied in accordance with image information to one or more hot melt inks stored in the ink jet printer. Each of hot melt inks may contain one or more inorganic pigments having different hues. The ink in solid form is molten due to supply of energy thereto and is made to fly, as ink droplets, onto the layer 16 of the image receiving sheet 10 in an imagewise manner. An image i comprised of hot melt ink(s) 18 is formed on the surface of the image receiving sheet 10 (see FIG. 1B; ink image forming step).

The image receiving sheet 10 on which the image i is formed, is partially immersed in water to dissolve the water-soluble polymer in the layer 14, and the layer 16 is peeled from the substrate 12 together with the ink image i. The water-soluble polymer in the layer 14 is partially dissolved, and therefore, when the layer 16 is disposed on a ceramic plate 20, the layer 16 is adhered to the surface of the ceramic plate 20. The ink image i is disposed on the surface of the ceramic plate 20 (see FIG. 1C; image disposing step). Subsequently, the ceramic plate 20 with the ink image i being disposed on the surface thereof, is calcined by a firing furnace. During calcination, the hydrophobic polymer contained in the layer 16, and components other than the inorganic pigment contained in the ink which forms an image (for example, wax or the like) are evaporated and/or incinerated, and the inorganic pigment contained in the ink is sintered on the surface of the ceramic plate 20 to produce a painted ceramic plate 22 (see FIG. 1D; image sintering step).

Next, a detailed description will be given of each of the steps in the production method according to the first aspect.

In the above-described image forming step, energy is supplied to the hot melt ink containing an inorganic pigment in accordance with image information, and ink droplets are made to fly onto the image receiving sheet in an imagewise manner to thereby form an image comprised of the above-described ink, on the image receiving sheet. In the image forming step, an image comprised of hot melt ink can be formed on the image receiving sheet using a conventional ink jet printer. The ink jet printer which can be used in this case, is not particularly limited. A wide variety of ink jet printers can be used so long as hot melt ink can be molten at the time of printing and energy sufficient to let the ink droplets fly can be supplied to the ink.

The image information is input, for example, as an electric signal, to the ink jet printer. The ink jet printer includes a heating means such as a heating element which can supply heat energy to hot melt ink stored in an ink chamber. When the heating means is a heating element, an electric current flows through a heating element located at a predetermined position in accordance with an electric signal and the heating element generates heat. Heat energy is transferred to an ink at a predetermined position in the ink chamber, and the ink in solid form is molten and boils to form bubbles, thereby causing an increase in the internal pressure of the ink chamber. As a result, the ink is jetted, as droplets, from a nozzle, and made to fly onto the surface of the image receiving sheet, which is set in the ink jet printer.

The above-described hot melt ink means ink in which color materials are dispersed in a medium such as wax, which is in solid form at ordinary temperature, and the ink is molten into liquid form by supplying energy thereto at the time of printing. In the present invention, inorganic pigments are used as color materials. The inorganic pigment has a large specific gravity compared with an ordinary color material comprised of an organic material. When the inorganic pigment is dispersed in a liquid such as water, it may settle or the like, therein. As a result, stable printing becomes difficult. In the present invention, since a material in solid form at ordinary temperature is used as the medium, sedimentation of the inorganic pigment can be prevented and stable printing becomes possible. The degree of preventing sedimentation is further improved by selecting from various materials.

Examples of the inorganic pigment to be contained in the hot melt ink include metal oxides such as copper oxide or cobalt oxide, whose crystal structure is spinel, sphene, pyrochlore, rutile, priderite, phosphate, phenacite, periclase, olivine, baddeleyite, borate, conundrum, or zircon; sulfide such as cadmium yellow; cadmium selenide compound such as selenium ruby, and the like. Further, inorganic pigments such as fluorescent pigment or phosphor pigment may also be used. These materials may be used singly or may be used in a combination of two or more. The above-described inorganic pigment may be directly dispersed in the medium. Alternatively, a master batch in which the inorganic pigment is dispersed at a high concentration in a suitable resin, for example, carnauba wax, acrylic resin, polyethylene, an ink vehicle, or the like, may be prepared in advance and dispersed in the medium.

The above-described medium may contain a glass component dispersed therein together with the inorganic pigment. It is preferable that the glass component is used together with the inorganic pigment, since in this case, melt adhesion of the inorganic pigment to the surface of the ceramic body can be improved in the image sintering step. Examples of the glass component include alkaline metal compounds such as lithium carbonate, sodium carbonate or potassium carbonate; alkaline earth metal compounds such as barium carbonate, strontium carbonate, calcium carbonate or magnesium carbonate; neutral components such as aluminum oxide or aluminum hydroxide; acid components such as silicon oxide, boric acid, zirconium oxide, or titanium oxide, and the like. Further, composite compounds such as borax, feldspar, or kaolin can also be used. The above-described glass components can be used as a so-called frit in such a manner that any one of the above-described materials, or a combination of two or more of the materials mixed together, is dissolved in the medium.

The amount of the inorganic pigment contained in the hot melt ink is preferably in the range from 10 to 80% by mass, more preferably in the range from 20 to 70% by mass, and most preferably in the range from 30 to 60% by mass. Further, when the glass component is used together with the inorganic pigment, a preferred amount of the glass component used varies depending on an inorganic pigment used therewith. A mixture of the glass component and the inorganic pigment is contained preferably in the range from 15 to 80% by mass, more preferably in the range from 30 to 70% by mass, and most preferably in the range from 40 to 60% by mass.

As the above-described medium, materials in solid form at ordinary temperature, into which the inorganic pigment is dispersible and which have properties of being molten by heat energy or the like supplied at the time of printing and which can be made to fly as ink droplets, can be widely used. For example, natural or synthetic waxes such as candelilla wax, carnauba wax, castor wax, haze wax, paraffin wax, micro crystalline wax, polyethylene wax, or alcohol wax; higher saturated or unsaturated fatty acids such as stearic acid or behenic acid; ketones such as stearone or laurone; fatty acid ester amide; saturated or unsaturated fatty acid amide; fatty acid ester; saturated or unsaturated fatty acid glyceride containing castor oil, curing castor oil, or the like; or resins such as rosin based resins, hydrocarbon based resins, amide based resins, polyester, polyvinyl acetate, acrylic acid based or methacrylic acid based high polymers, styrene based high polymers, ethylene vinyl acetate copolymer, polyketone, silicone, or coumarone, is used. Among these materials, wax materials are preferable.

The above-described hot melt ink can, when necessary, contain other various additives, for example, surface finishing agent, surfactant, viscosity depressant, antioxidant, plasticizer, antiseptic agent, dispersing agent, and dyes.

The above-described hot melt ink can be prepared by mixing the inorganic pigment, the material which serves as the medium, and when necessary, the above-described various additives, and dispersing the inorganic pigment (and when necessary, the above-described various additives) in the medium. The mixing and dispersing can be carried out by using various conventionally known pulverizing machines and dispersing machines.

The image receiving sheet which can be used in the first aspect of the present invention can be selected from a wide range so long as the ink retention property is such that even if droplets of the hot melt ink which were made to fly onto the transfer sheet are again cooled into solid form, they do not fall off from the surface of the sheet. For example, ordinary paper, a plastic film, cloth, and the like can be used in a wide range. Preferably, the image receiving sheet is partially or entirely disposed on the surface of the ceramic body together with an image, and in the image sintering process, it is evaporated or incinerated.

It is preferable that the above-described image receiving sheet can be adhered to the surface of the ceramic body in the same manner as in the image receiving sheet used in the above-described embodiment, since operation becomes easy even when a ceramic body having a curved configuration, such as a dish or a bottle, is used. The image receiving sheet, as described above, is a sheet which has a structure in which a layer comprised of a water-soluble polymer (which may be referred to as "water-soluble polymer layer"), and a layer comprised of a hydrophobic polymer (which may be referred to as "hydrophobic polymer layer") are successively formed on a paper substrate. Examples of the substrate include a paper substrate, polyethylene terephthalate, polyamide, polycarbonate, glassine paper, cellulose ester, fluorine containing polymer, polyether, polyacetal, polyolefin, polyimide, polyphenylenesulfide, polypropylene, polysulphone, cellophane, polyethylene terephthalate, and the like. When the substrate is a plastic film, preferably, it has a mold releasing layer containing a higher fatty acid or fluorine containing compound, on the surface thereof (that is, the surface on which the above-described water soluble polymer layer is formed). Alternatively, the substrate may also be comprised of only the mold releasing layer.

In a case where the substrate is paper, preferably, the above-described water-soluble polymer is partially dissolved so that the hydrophobic polymer layer can be peeled from the substrate, and the peeled hydrophobic polymer can be adhered to the surface of a ceramic body such as a ceramic plate due to the water-soluble polymer. Examples of the water soluble polymer include polymers used for painting of ceramic, such as dextrin or gum arabic, polyvinyl alcohol, carboxymethyl cellulose, methyl cellulose, hydroxyethyl cellulose, gelatin, and the like. Further, examples of the hydrophobic polymer include thermoplastic resins such as polyvinyl butyral resin, ethylene-vinyl acetate copolymer, ethylene-acrylic ester copolymer, stylene-acrylic ester copolymer, stylene-maleic acid-acrylic ester copolymer, polyamide, polystyrene, polyester, polyvinyl acetate resin, cellulose derivatives, polystyrene methacrylate based resin, polyvinyl ether based resin, polyurethane based resin, polycarbonate based resin, rosin based resin, and the like. Further, a resin used as an overprint lacquer for finish painting of a ceramic body such as ceramic, is preferably used. For example, acrylic resin, urethane based resin, or the like is used. Further, the substrate of the present invention may be a permeable material.

Figure 1C:
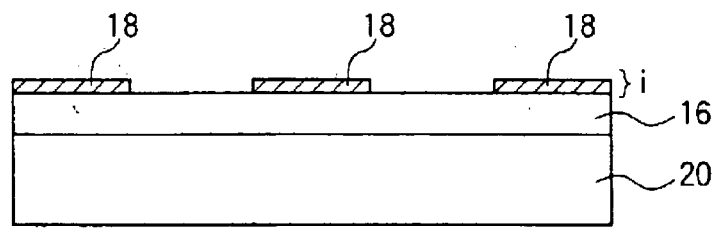
Figure 1D:
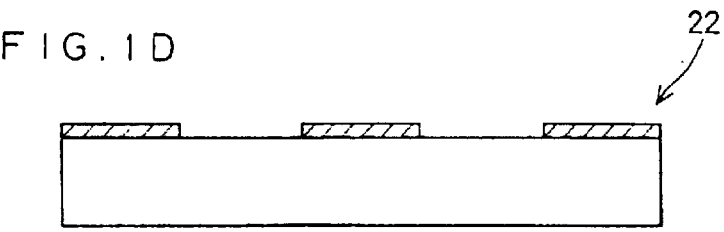

In the above-described image disposing step, an ink image formed on the image receiving sheet is disposed on the surface of the ceramic body together with all or a part of the image receiving sheet. When the image receiving sheet has the above-described structure comprised of the paper substrate, the water-soluble polymer layer, and the hydrophobic polymer layer, at least a portion of the water-soluble polymer is dissolved due to the image receiving sheet being immersed in water, and the hydrophobic polymer layer can be peeled from the paper support together with the ink image. The water-soluble polymer dissolved partially in water remains on a rear surface of the hydrophobic polymer layer (that is, the surface on which no ink image is formed), and therefore, the hydrophobic polymer layer can be easily adhered to the surface of the ceramic body. When a plastic film is used as the substrate, due to surface treatment for forming a mold releasing layer on the film being carried out in advance as described above, the hydrophobic polymer layer with the ink image formed thereon, can be peeled from a film support without being immersed in water. The separated hydrophobic polymer layer may be adhered to the surface of the ceramic body such as a ceramic plate via an adhesive layer as shown in FIG. 1C.

The ink image formed on the image receiving sheet may also be disposed in a reversed manner when disposed on the surface of the ceramic body. That is, the ink image may be disposed on the surface of the ceramic body in such a manner that after a reverse image is formed in advance on the image receiving sheet, an image portion (image side) is disposed so as to face the surface of the ceramic body (the image is reversed again). In this case, the above-described hydrophobic polymer layer does not exist between the image and the surface of the ceramic body. This structure is preferable since, in the subsequent image sintering step, sintering of the inorganic pigment and the ceramic body proceeds more stably. The surface of the hydrophobic polymer layer (that is, the surface on which the ink image is formed) has no adhesive property. Therefore, when the ink image is disposed in such a manner that an image is made to face the surface of the ceramic body as described above, it is preferable that a water soluble polymer having adhesive properties is applied to the surface of the ceramic body.

In the above-described image sintering step, the ceramic body on which the ink image is disposed, is heated, and the inorganic pigment contained in the transfer image is sintered on the surface of the ceramic body. The inorganic pigment is sintered on the surface of the ceramic body, and components other than ink, for example, wax contained in the ink forming an image portion, and all or a part of the image receiving sheet disposed, together with an image, on the surface of the ceramic body, is evaporated or incinerated.

Heating of the ceramic body is preferably carried out by using, for example, an electric furnace from the standpoint of temperature control, coloring property, and the like. Heating conditions can be suitably set in accordance with selected materials, the volume of a ceramic body, the image size, and the like. It is preferable that heating be carried out in such a manner that the temperature be gradually increased to a calcination temperature, or heating be carried out in such a manner that after constant temperature heating is carried out at 300 to 500° C. for a fixed period of time, the temperature be gradually increased to a calcination temperature. When overglaze colors comprising the inorganic pigments are used, the calcination temperature is usually set in the range from 650 to 900° C., more preferably in the range from 750 to 850° C., and a calcination time is preferably one to eight hours. Further, when underglaze colors comprising the inorganic pigments are used, the calcination temperature is usually set in the range from 1000 to 1300° C., more preferably in the range from 1100 to 1250° C., and a calcination time is preferably one to eight hours.

Next, a description will be given of embodiments according to the second to fifth aspects of the present invention.

The method for producing a painted ceramic body according to the second to fifth aspects of the present invention includes a latent image forming step in which a latent image is formed on at least one of an image donating layer and an image receiving layer with a transfer accelerating material which can accelerate transfer of a painting inorganic pigment and the like contained in the image donating layer, to the image receiving material. Next, the above-described method also includes a transfer step in which the image donating layer is transferred to the image receiving layer in an imagewise manner in accordance with the latent image formed in the latent image forming step, and an image comprised of the image donating layer is formed on the image receiving layer. In the third aspect in which the image receiving layer is formed on the surface of the ceramic body, after a transfer step, a sintering step can be carried out in which the ceramic body is heated, and an inorganic pigment contained in the image donating layer is sintered on the surface of the ceramic body to form an image on the surface of the ceramic body. In the case of the second aspect in which the above-described latent image forming step and transfer step are each carried out by using an image receiving sheet comprised of the substrate and the image receiving layer, after the above-described transfer step, a disposing step in which an image comprised of the image donating layer is disposed on the surface of the ceramic body together with the image receiving layer, is carried out, and thereafter, the above-described sintering step is carried out. Between the transfer step and the disposing step, a second transfer step may be performed in which the image comprised of the image donating layer is transferred to other image receiving sheets.

An embodiment of the method for producing a painted ceramic body according to the third aspect of the present invention will be described hereinafter with reference to FIGS. 2A to 2E. This embodiment is structured such that an image receiving sheet in which an image receiving layer containing a thermoplastic resin is provided on a substrate, is used.

Figure 2A:
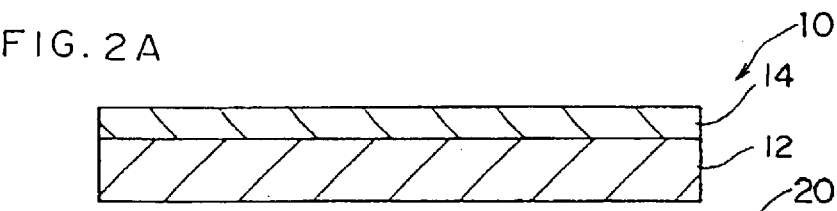
FIGS. 2A to 2E are schematic diagrams for illustrating an embodiment of a method for producing a painted ceramic body according to a second aspect of the present invention.
Figure 2B:
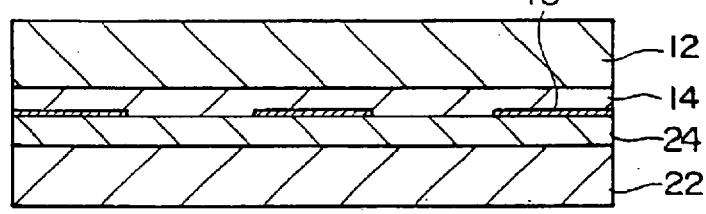
Figure 2C:
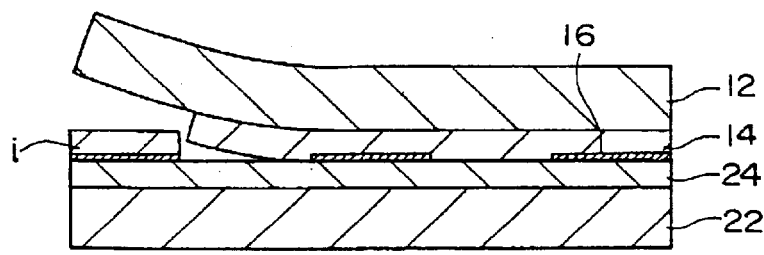

First, an image donating sheet 10 and an image receiving sheet 20 are prepared (see FIG. 2A). The image donating sheet 10 includes a substrate 12 and an image donating layer 14 formed thereon containing at least an inorganic pigment. The image receiving sheet 20 includes a substrate 22 and an image receiving layer 24 formed thereon and allowing transfer and fixing of the image receiving layer 14. Next, droplets containing a transfer accelerating material 16 are applied in an imagewise manner to the surface of the image receiving layer 24 of the image receiving sheet 20 by an ink jet recording device (not shown) in accordance with image information (a latent image forming step). Subsequently, the image donating sheet 10 and the image receiving sheet 20 are heated and bonded together in such a manner that the surface of the image donating layer 14 of the image donating sheet 10 and the surface of the image receiving layer 24 of the image receiving sheet 20 are made to face and contact each other (see FIG. 2B). The image donating layer 14 is transferred to the surface of the image receiving layer 24 only in a region in which the transfer accelerating material is applied, and an image i comprised of the image donating layer is formed on the surface of the image receiving layer 24 (a transfer step; see FIG. 2C).

Figure 2D:
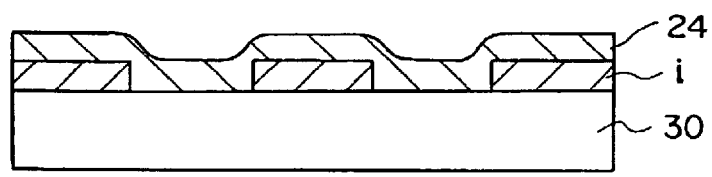
Figure 2E:
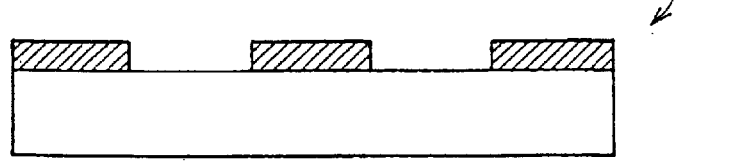

Next, the image receiving layer 24 having the image i comprised of the transfer material is adhered by heat bonding to the surface of a ceramic plate 30 which is the ceramic body, and the image i comprised of the image donating layer is disposed on the surface of the ceramic plate 30 together with the image receiving layer 24 (see FIG. 2D; a disposing step). When the ceramic plate 30 is calcined by an electric furnace, during calcination, various components in the image receiving layer 24, and components other than the inorganic pigment contained in the image donating layer which forms the image i (for example, binder and the like) are evaporated and/or incinerated, and the inorganic pigment contained in the image donating layer is sintered on the surface of the ceramic plate 30 to produce a painted ceramic plate 32 (see FIG. 2E; a sintering step).

Next, a description will be given of another embodiment according to the present invention with reference to FIGS. 3A to 3E. In this embodiment, an adhesive image receiving sheet is used, wherein a layer comprised of a water soluble polymer is formed on a substrate and an image receiving layer comprised of a hydrophobic polymer is formed on the water soluble polymer. Note that the same portions as those of FIGS. 2A to 2E are denoted by the same reference numerals, and a detailed description thereof will be omitted.

Figure 3A:
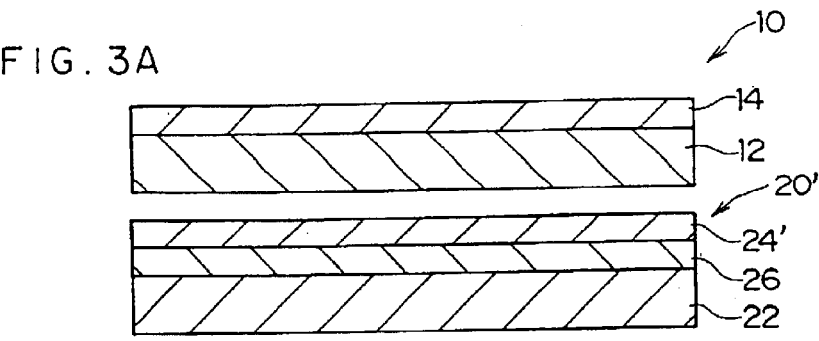
FIGS. 3A to 3E are schematic process diagrams for illustrating another embodiment of a method for producing a painted ceramic body according to the second aspect of the present invention.
Figure 3B:
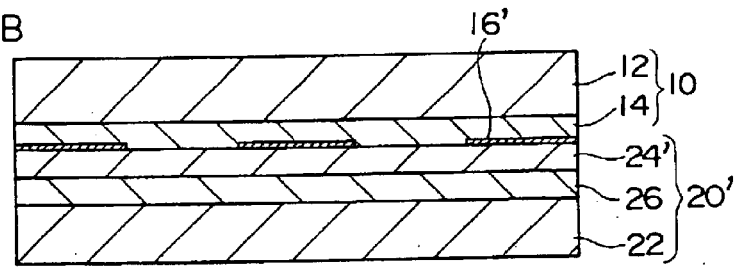
Figure 3C:
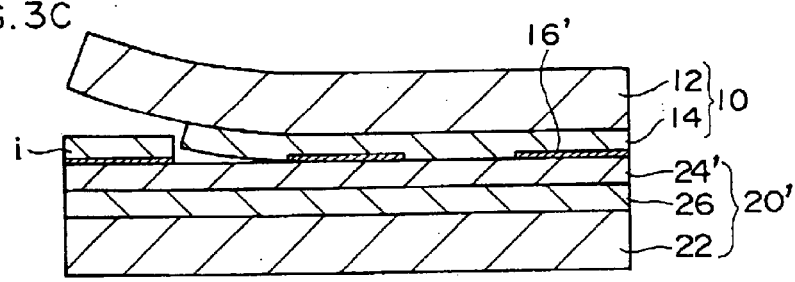
Figure 3D:
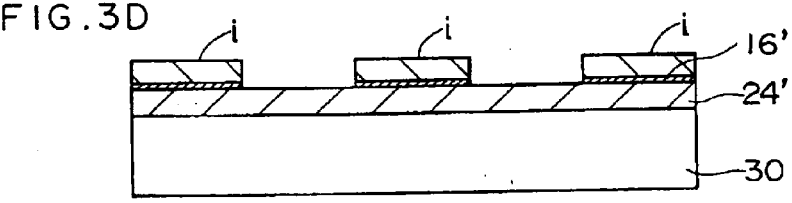
Figure 3D:
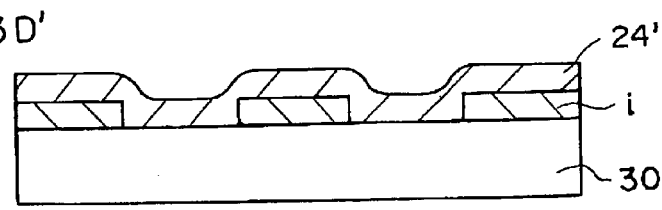
Figure 3E:
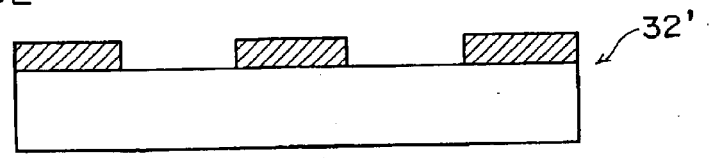

First, the transfer sheet 10 comprised of the substrate 12 and the image donating layer 14, and an image receiving sheet 20' are prepared (see FIG. 3A). The image receiving sheet 20' includes the substrate 22, a layer 26 comprised of a water-soluble polymer, and an image receiving layer 24' comprised of a hydrophobic polymer, which layers 26 and 24' are successively formed on the substrate 22. The image receiving layer 24' is formed so as to allow transfer and fixing of the image donating layer 14 in an imagewise manner. Next, droplets or a toner containing transfer accelerating material 16' are applied in an imagewise manner to the surface of the image receiving layer 24' of the image receiving sheet 20' by an ink jet recording device or an electrophotographic printer (not shown) in accordance with image information (a latent image forming step). The toner image formed using the electrophotographic printer usually contains a thermoplastic resin, that exhibits transfer accelerating effect. Thereafter, the image donating sheet 10 and the image receiving sheet 20' are heated and bonded together in such a manner that the surface of the image donating layer 14 of the image donating sheet 10 and the surface of the image receiving layer 24' of the image receiving sheet 20' are made to face and contact each other (see FIG. 3B). The image donating layer 14 is transferred to the surface of the image receiving layer 24' only in a region in which the transfer accelerating material 16' is applied, and an image i comprised of the image donating layer is transferred to the surface of the image receiving layer 24' (a transfer step; see FIG. 3C).

Subsequently, the image receiving sheet 20' on which the image i is formed, is partially immersed in water to dissolve a water soluble polymer contained in the layer 26, and the layer 24' is peeled from the substrate 22 together with the image i. The water soluble polymer in the layer 26 is partially dissolved, and therefore, when the layer 24' is disposed on the ceramic plate 30, the layer 24' is adhered to the surface of the ceramic plate 30. The water soluble polymer of the layer 26 may or may not be adhered to the surface of the ceramic plate 30 together with the layer 24'. At this time, the image i may be disposed to contact with the ceramic plate 30 and then adhered using an adhesive (see FIG. 3D'). The image i comprised of the image donating layer is disposed on the surface of the ceramic plate 30 together with the layer 24' (see FIG. 3D; an image disposing step). Subsequently, the ceramic plate 30 with the image i formed on the surface thereof, is calcined by an electric furnace. During calcination, various components in the layer 24', and components other than the inorganic pigment contained in the image donating layer which forms the image i (for example, binder and the like) are evaporated and/or incinerated, and the inorganic pigment contained in the image donating layer is sintered on the surface of the ceramic plate 30 to thereby produce a painted ceramic plate 32' (see FIG. 3E; a sintering step).

A description will be given of still another embodiment according to the present invention with reference to FIGS. 4A to 4E. In this embodiment, an image receiving layer is formed on the surface of a ceramic plate which is a ceramic body. Note that the same portions as those of FIGS. 1A to 1D will be denoted by the same reference numerals, and a detailed description thereof will be omitted.

Figure 4A:
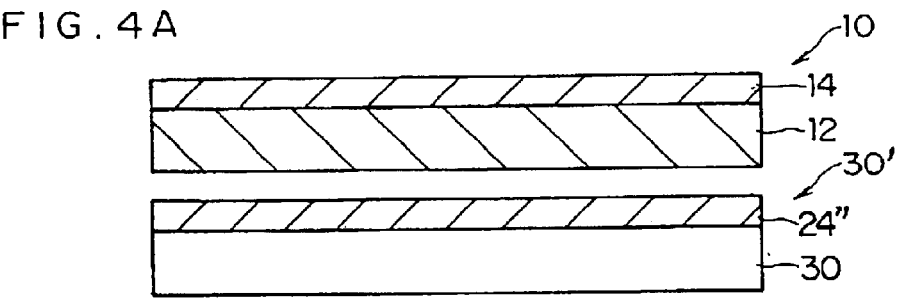
FIGS. 4A to 4E are schematic process diagrams for illustrating another embodiment of the method for producing a painted ceramic body according to a third aspect of the present invention.
Figure 4B:
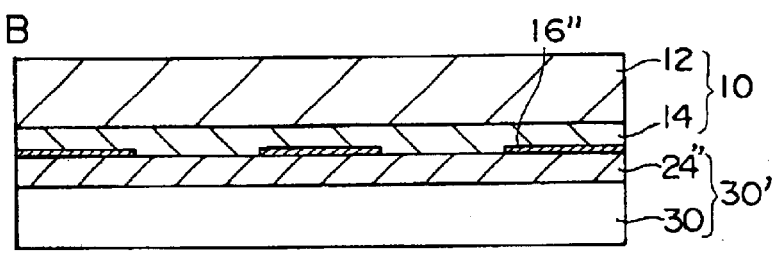
Figure 4C:
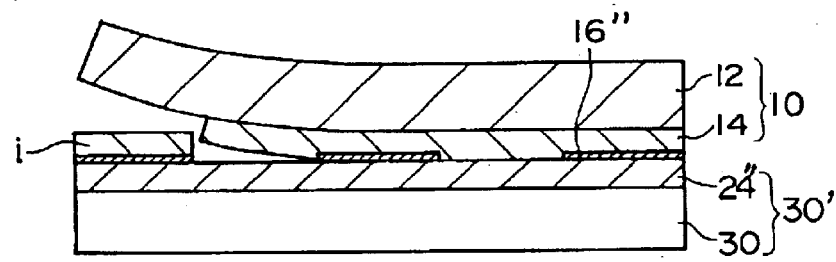
Figure 4D:
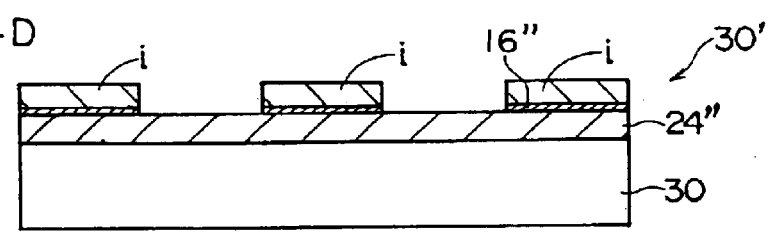
Figure 4D:
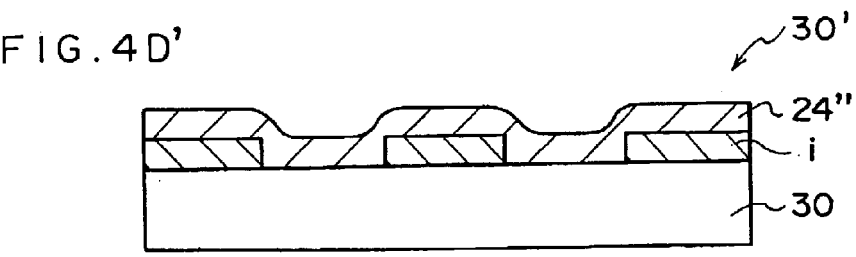
Figure 4E:
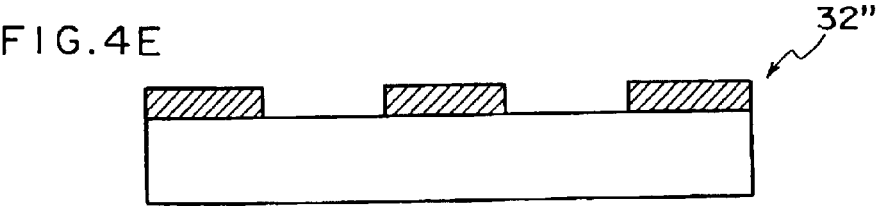

First, the transfer sheet 10 comprised of the substrate 12 and the image donating layer 14, and a ceramic plate 30' having an image receiving layer 24" formed on the surface thereof are prepared (see FIG. 4A). The image receiving layer 24" is formed in such a manner that the image donating layer 14 can be transferred and fixed thereon in an imagewise manner. The image donating layer may also be constructed such that the surface of the ceramic plate 30' can serve as the image receiving layer, to thereby obviate the disposition of the image receiving layer 24". Next, droplets containing a transfer accelerating material 16" are applied in an imagewise manner to the surface of the image receiving layer 24" by an ink jet recording device or an electrophotographic printer (not shown) in accordance with image information (a latent image forming step). Thereafter, the surface of the image donating layer 14 of the image donating sheet 10 and the surface of the image receiving layer 24" are heated and bonded together in such a manner as to face and contact each other (see FIG. 4B). The image donating layer 14 is transferred to the surface of the image receiving layer 24" only in a region in which the transfer accelerating material 16" is applied, and the image i comprised of the image donating layer is transferred to the surface of the image receiving layer 24" (a transfer step; see FIG. 4C).

Subsequently, the ceramic plate 30' with the image i formed on the surface thereof (see FIG. 4D or 4D') is calcined by an electric furnace. During calcination, various components in the image receiving layer 24", and components other than the inorganic pigment contained in the image donating layer which forms the image i (for example, a binder and the like) are evaporated and/or incinerated, and the inorganic pigment contained in the image donating layer is sintered on the surface of the ceramic plate 30' to thereby produce a painted ceramic plate 32" (see FIG. 4E; a sintering step).

Next, a description will be given of various materials which can be used in the method for producing a painted ceramic body according to the second to fifth aspects of the present invention.

First, the transfer accelerating material will be described.

The transfer accelerating material which can be used in the above-described latent image forming step, is a material which can decrease a transfer temperature of the transfer material contained in the transfer layer, that is, accelerates transfer. In case where an ink jet recording device is used, the transfer accelerating material is preferably a liquid composition, and also preferably contains no solid material which may precipitate with the passage of time. Examples of the transfer accelerating material include water, organic solvents, surfactants, and mixtures thereof. Among them, organic solvents which are freely mixed with water at ordinary temperatures, surfactants which can be mixed with water, and mixtures thereof are preferably used. Further, the transfer accelerating material may preferably be a material which does not chemically act on the inorganic pigment contained in the transfer material and does not show coloring reaction even if heat energy is supplied in a subsequent transfer step or the like when necessary. Moreover, the transfer accelerating material itself is preferably a colorless or light-colored one.

Specific examples of the above-described organic solvents include: monohydric or polyhydric alcohols such as methyl alcohol, ethyl alcohol, n-propyl alcohol, isopropyl alcohol, n-butyl alcohol, sec-butyl alcohol, isobutyl alcohol, ethylene glycol, diethylene glycol, thiodiethylene glycol, triethylene glycol, polyethylene glycol, propylene glycol, butylene glycol, 1,2,6-hexane triol, hexylene glycol, polypropylene glycol, and glycerin; ethers such as ethylene glycol monomethyl ether, ethylene glycol monoethyl ether, ethylene glycol monobutyl ether, diethylene glycol monomethyl ether, diethylene glycol monoethyl ether, ethylene glycol diethyl ether, propylene glycol monomethyl ether, propylene glycol monoethyl ether, propylene glycol monobutyl ether, triethylene glycol monoethyl ether, triethylene glycol monobutyl ether, and tripropylene glycol monomethyl ether; keto alcohols such as diaceton alcohol; nitrogen-contained solvents such as N-methyl-2-pyrolidone and 2-pyrolidone; and the like.

As the above-described surfactants, any of anion, cation, nonion, and amphoteric surfactants can be used and can arbitrarily selected in accordance with characteristics of a transfer material to be used in combination therewith. When the surfactant is used in a state of being dissolved in water, it can be used at a concentration within the range in which it can be dissolved in water. Specifically, fatty acid salt, alkyl sulfate, polyoxyethylene alkyl ether sulfate, alkyl benzene sulfonate, alkyl naphthalene sulphonate, alkylsulfosuccinate, alkyl diphenylether disulfonate, alkyl phosphate, naphthalene sulfonic acid-formaline condensate, polyoxyethylene alkyl ether, polyoxyethylenealkylene alkyl ether, polyoxyethylene fatty acid ester, polyoxyethylene alkyl amine, alkylalkanol amine, alkyl amine salt, alkyl betaine, mono- or di-hydroxyacetylene compound, and the like can be used.

As the transfer accelerating material, a stable dispersion of fine particles composed of a thermoplastic resin (a latex, or emulsion) or the like may preferably be used. As the thermoplastic resin, a high molecular weight copolymer, which will be described later as the binder for use in the image donating layer, may preferably used. It is preferred that the thermoplastic resin used as the transfer accelerating material has a glass transition point or melting point lower than that of the thermoplastic resins used in the image donating layer, preferably lower by five degrees or more.

The transfer accelerating material may be used singly or may be used in a combination of two or more. Particularly, the above-described organic solvents and/or the above-described surfactants may be preferably used by being mixed with water from the standpoint of obtaining effects. For the purpose of adjusting discharge suitability of the ink when jetting as droplets, preventing diffusion of droplets, and improving preservation stability, the transfer accelerating material may contain a surface tension adjusting agent, a mildew resisting agent, a viscosity adjusting agent, a pH adjusting agent, an anti-foaming agent, and the like in the scope in which effects of the present invention are not compromised.

The transfer accelerating material preferably has excellent permeability for the image donating layer and/or image receiving layer, and also preferably has physical properties in which the surface tension thereof is 25 to 60 mN/m and viscosity thereof is 50 mPa·s or less. Further, the transfer accelerating material preferably does not solubilize the above-described image donating layer itself. When the image donating layer is dissolved by the transfer accelerating material, permeation of the transfer accelerating material and dissolution of the image donating layer are caused at an interface of an image portion and a non-image portion, and the sharpness of the image interface may be deteriorated. When a material which solubilizes the image donating layer is used as the transfer accelerating material, an amount of the transfer accelerating material discharged is preferably decreased.

In order that a transfer temperature of the image donating layer, that is, a temperature at which the image donating layer can be transferred, may be decreased due to action of the transfer accelerating material, preferably, the transfer accelerating material is utilized such that the transfer temperature of the image donating layer when the transfer accelerating material is used, is lower than that when no transfer accelerating material is used, by three degrees, in particular, by five degrees.

The transfer temperature can be measured by, for example, passing a laminate of the image donating sheet and the image receiving sheet with a thermocouple interposed therebetween, between a pair of heating nip rollers including at least one heating roller whose temperature is variable. The transfer temperature is measured by using the thermocouple. Further, by changing a heating temperature by the heating roller, the transfer temperature can be obtained as a lowest temperature at which transfer occurs.

When the transfer accelerating material contains the nonionic surfactant and water, an effect of decreasing the transfer temperature is great and the transfer property of micro points is excellent. Therefore, a transfer image having a high resolution can be obtained. It is particularly preferable that the above-described nonionic surfactant is a nonion compound having an ethylene oxide group added as a hydrophilic group. When the nonion compound having an ethylene oxide group added thereto is used, preferably, the effect of decreasing the transfer temperature of a latent image forming portion is great and high resolution is obtained. The above-described nonion based compound may be any one of compounds expressed by the following general formulae 1 to 4, or the like.

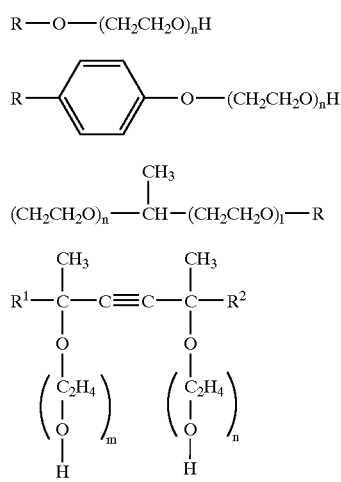

In the above-described general formula 1, R represents an alkyl group or an alkylene group, and n represents an integer of 2 to 30, and preferably 2 to 20. In the above-described general formula 2, R represents an alkyl group and n represents an integer of 2 to 30, and preferably 2 to 20. In the above-described general formula 3, R represents an alkyl group, and n and l each represents an integer of 2 to 30, and preferably 2 to 20. In the above-described general formula 4, $R^1$ and $R^2$ each represents hydrogen or an alkyl group, and m and n each represents an integer of 2 to 30, and preferably 2 to 20.

Further, in the above-described general formulae 1 to 4, the number of addition of ethylene oxide is preferably 2 to 30, and 2 to 20 is particularly preferable. Concrete examples of the compounds represented by the above-described general formulae 1 to 4 include polyoxyethylene (4) lauryl ether, polyoxyethylene (7) cetyl ether, polyoxyethylene (13) stearyl ether, polyoxyethylene (5) oleyl ether, polyoxyethylene (10) nonylphenyl ether, ethylene oxide-propylene oxide copolymer (n=10, l=7), ethylene oxide addition compound of acetylene glycol (n+m=10), and the like. However, the present invention is not limited to these compounds.

The amount of the above-described nonionic surfactant contained in the transfer accelerating material is preferably 0.1 to 20% by mass, and more preferably 0.1 to 10% by mass. When the content exceeds 20% by mass, the resolution tends to decrease. Further, the content is less than 0.1% by mass, the effect of accelerating the transfer property is difficult to obtain. Further, the above-described transfer accelerating material can contain a water soluble organic solvent together with the nonionic surfactant. As the water soluble organic solvent, any one of the materials listed above as the organic solvent which can be freely mixed with water, can be used. The amount of the water soluble organic solvent contained in the transfer accelerating material is suitably about 0 to 90% by mass.

Further, the above-described transfer accelerating material preferably may also be a material containing water and an organic solvent having a boiling point of 100° C. or higher at ordinary temperatures and at normal pressures, and compatible with water. In this case, discharge stability of the solution improves and it is possible to prevent occurrence of a phenomenon in which the solution may not be discharged at the time of forming a latent image and at the time of restart after a waiting state. Further, the transfer property of micro dots also improves. Therefore, a transferred image having a high resolution can be obtained and thus the organic solvent having a boiling point of 100° C. or higher at ordinary temperatures and at normal pressures and compatible with water is preferable. Examples thereof include: monohydric or polyhydric alcohols such as ethylene glycol, diethylene glycol, thiodiethylene glycol, triethylene glycol, polyethylene glycol, propylene glycol, polypropylene glycol, and glycerin; ethers such as ethylene glycol monomethyl ether, ethylene glycol monoethyl ether, ethylene glycol monobutyl ether, diethylene glycol monomethyl ether, diethylene glycol monoethyl ether, ethylene glycol diethyl ether, propylene glycol monomethyl ether, propylene glycol monoethyl ether, propylene glycol monobutyl ether, triethylene glycol monoethyl ether, triethylene glycol monobutyl ether, and tripropylene glycol monomethyl ether; keto alcohols such as diaceton alcohol; nitrogen-contained solvents such as N-methyl-2-pyrolidone and 2-pyrolidone; and the like.

The amount of the above-described organic solvent contained in the transfer accelerating material is preferably 1 to 90% by mass. When the content exceeds 90% by mass, the discharge stability at the time of forming a latent image improves, but the drying property of a transfer image tends to decrease. Further, when the content is less than 1% by mass, the discharge stability and the improvement in the transfer property of micro dots are difficult to obtain. Further, as a material for decreasing the transfer temperature, in addition to the above-described organic solvent, the organic solvent which can be freely mixed with water, which has been already listed, or the above-described surfactant can be added.

In the above-described latent image forming step according to the second to fifth aspects, the above-described transfer accelerating material may merely be applied in an imagewise manner to at least one of the surface of the transfer layer and the surface of the image receiving layer. In order that the above-described transfer accelerating material be applied in an imagewise manner to the surface of the transfer layer or the like, a generally known ink jet recording-type or electrophotographic-type image forming method can be used. For example, in the case of the former method, an ink jet head having heating elements therein is filled with the transfer accelerating material in liquid form, and an electric current is made to flow through a heating element located at a predetermined position in accordance with image information to allow heating of the heating element and boiling of a solvent (water, organic solvent, or the like) of the transfer accelerating material in the vicinity of the heating element, thereby increasing the pressure within the head. As a result, the transfer accelerating material at a desired position is made to fly as droplets and adhere to the surface of any one of the transfer layer and the image receiving layer. Alternatively, by using various ink jet recording type methods including an ink jet recording type method using a piezoelectric element, the transfer accelerating material can be applied in an imagewise manner to the surface of the transfer layer or the like.

Next, a description will be given of the image donating sheet.

A latent image formed by the above-described latent image forming step is developed by a transfer step. In the transfer step, a latent image formed by the transfer accelerating material is transferred to be developed by using a image donating sheet. The image donating sheet may be for example, a sheet comprised of a substrate and an image donating layer formed thereon and containing a painting inorganic pigment and a binder and/or a hot melt organic substance.

The substrate of the image donating sheet is not particularly limited and various substrates can be used in accordance with the purposes. Preferred examples of the substrate include synthetic resin materials such as polyethylene terephthalate, polyethylene-2,6-naphthalate, polycarbonate, polyethylene, polyvinyl chloride, polyvinylidene chloride, polystyrene, and styrene-acrylonitrile copolymer. Among them, biaxial oriented polyethylene terephthalate is preferably used in consideration of dimensional stability with respect to mechanical strength or heat.

It is preferable that surface roughening processing and/or provision of a one-layer or multi-layer undercoat layer be carried out for the substrate of the image donating sheet for the purpose of improving adhesiveness between the substrate and the image donating layer provided thereon. Examples of the surface roughening processing include glow discharge processing, corona discharge processing, and the like. A material of the undercoat layer may preferably have high adhesiveness for each surface of the substrate and the image donating layer, low heat conductivity, and excellent heat resistance. Examples of such materials of the undercoat layer include styrene, styrene-butadiene copolymer, gelatin, and the like. The thickness of the undercoat layer is usually 0.01 to 2 $\mu$m. Further, when necessary, provision of various functional layers such as a mold release layer, or surface treatment can be carried out for a surface of the image donating sheet at a side opposite to that at which the image donating layer is provided.

The above-described image donating layer contains at least an inorganic pigment, and also contains a binder for forming a layer, and when necessary, other components. As the above-described inorganic pigment, the inorganic pigments which can be contained in the hot melt ink described in the first aspect, can be used singly or in a combination of two or more. The image donating layer may contain glass components together with the inorganic pigment. The glass components which can be contained in the hot melt ink described in the first aspect, can also be used singly or in a combination of two or more. When the glass components are used together with the inorganic pigment, in the sintering step, melt adhesiveness of the inorganic pigment to the surface of the ceramic body can be preferably improved. A product into which a single kind of glass component or a combination of two or more kinds of glass components is molten, can be used as the frit.

The binder in the image donating layer may preferably be an amorphous organic high molecular polymer having a softening point of 40 to 150° C. Examples of the amorphous organic high molecular polymer include butyral resin, polyamide resin, polyethylene imine resin, sulfonamide resin, polyester polyol resin, petroleum resin, a homopolymer or copolymer of styrenes such as styrene, vinyl toluene, α-methylstyrene, 2-methylstyrene, chlorostyrene, vinyl benzoate, vinylbenzene sulfonate soda, or aminostyrene, and of derivative or substitution product thereof, and a homopolymer or copolymer which is polymerized with other monomers, of methacrylates and methacrylic acid such as methyl methacrylate, ethyl methacrylate, butyl methacrylate, and hydroxyethyl methacrylate, acrylates and acrylic acid such as methyl acrylate, ethyl acrylate, butyl acrylate, and α-ethylhexyl acrylate, dienes such as butadiene or isoprene, vinyl based monomer such as acrylonitrile, vinyl ethers, maleic acid and maleates, maleic anhydride, cinnamic acid, and vinyl chloride or vinyl acetate. These materials can also be used in a combination of two or more.

The amount of the inorganic pigment contained in the image donating layer is preferably 10 to 80% by mass, more preferably 20 to 70% by mass, and still more preferably 30 to 60% by mass. Further, when the glass component is used together with the organic pigment, a preferred amount of glass component used varies depending on the inorganic pigment to be used together therewith. The amount of a mixture of the glass component and the inorganic pigment contained in the transfer layer, is preferably 15 to 80% by mass, more preferably 30 to 70% by mass, and still more preferably 40 to 60% by mass.

When a multicolor image is formed in such a manner that a large number of image layers (image donating layers with images formed thereon) are repeatedly made to overlap with one another on the same image receiving layer, the image donating layer may preferably contain a plasticizer for the purpose of improving adhesiveness between images. Examples of the plasticizer include ester phthalates such as dibutyl phthalate, di-n-octyl phthalate, di(2-ethylhexyl) phthalate, phthalate dinonyl, dilauryl phthalate, butyl lauryl phthalate, and butyl benzyl phthalate, aliphatic dibasic acid esters such as di(2-ethylhexyl)adipate, and di(2-ethylhexyl) sebacate, triester phosphate such as tricresyl phosphate and tri(2-ethylhexyl) phosphate, polyol polyesters such as polyethylene glycol ester, and epoxy compound such as epoxy fatty acid ester. In addition to the above-described general plasticizers, acrylic esters such as polyethylene glycol dimethacrylate, 1,2,4-butanetrioltrimethacylate, trimethylolethanetriacrylate, pentaerythritol triacrylate, pentaerythritol tetraacrylate, and dipentaerythritol-polyacrylate may also be suitably used together depending on the kind of binder to be used. The plasticizer may also be used in a combination of two or more.

The amount of the above-described plasticizer contained in the image donating layer is set such that the ratio between the total mass of the inorganic pigment and the binder, and the mass of the plasticizer is generally in the range from 100:1 to 100:3, and preferably in the range from 100:1.5 to 100:2. Further, when necessary, a surfactant, a thickener, and the like can be added to the image donating layer. It is preferable that the amount of the plasticizer added to the image donating layer is progressively increased in later steps, that is, the plasticizer is incrementally added in subsequent procedures.

The above-described image donating layer can be provided by preparing a coating liquid in which the inorganic pigment and components of the image donating layer such as the binder, are dissolved or dispersed, and applying the coating liquid to the substrate (or the undercoat layer if the undercoat layer is provided on the substrate), and drying the same. A solvent used for preparing the coating liquid may be n-propyl alcohol, methylethyl ketone, propylene glycol monomethyl ether (MFG), methanol, or the like. Coating and drying can be carried out by using any ordinary coating and drying methods respectively.

Coating of the image donating layer may preferably be conducted using an aqueous system from the viewpoints of working safety, working efficiency and environmental factors. In such a case, the binder, the hot melt organic substance, the plasticizer and the like are used in the form of an aqueous dispersion (a latex, or emulsion).

The thickness of the image donating layer (that is, the thickness of a dry layer) is set in the range from 0.1 to 3.0 µm, and more preferably 0.3 to 2.0 µm.

Next, a description will be given of an image receiving sheet.

The above-described image receiving sheet is usually provided on a substrate and is used in the form of an image receiving sheet comprised of a substrate and an image receiving layer. Further, the image receiving layer may also be formed on a ceramic body.

The above-described image receiving sheet preferably may have a structure in which at least one image receiving layer is formed on a substrate, and when desired, one or plural layers of a cushion layer, a release layer, and an intermediate layer is/are provided between the substrate and the image receiving layer. However, insofar as adhesiveness to the above-described image donating layer is adequate, resin sheet such as polyethylene terephthalate (PET), plain paper, coat paper, glass epoxy sheet, metal plate, and the like can also be used as the image receiving sheet, without providing image receiving layer. In the image receiving sheet having the image receiving layer formed on the substrate, preferably, a back layer is provided on a surface of the substrate at a side opposite to that at which the image receiving layer is provided, so as to improve the conveying property.

As the substrate of the image receiving sheet, ordinary sheet-shaped substrates such as plastic sheet, metal sheet, glass sheet, and paper are used. Examples of plastic sheet include polyethylene terephthalate sheet, polycarbonate sheet, polyethylene sheet, polyvinyl chloride sheet, polyvinylidene chloride sheet, polystyrene sheet, styrene-acrylonitrile sheet, polyester sheet, and the like. Further, as a paper substrate, printing paper having excellent smoothness, coat paper, and the like can be used.

When an image comprised of the image donating layer is disposed together with the entire image receiving sheet in the disposing step, the substrate of the image receiving sheet needs to be evaporated and/or incinerated in the sintering step. Therefore, it is preferable that the substrate may not contain an atom or compound which is not eliminated by evaporation or combustion in the sintering step and may not contain an atom or compound which reacts with a pigment to discolor the same.

When the substrate of the image receiving sheet has microscopic voids, preferably, curling can be prevented and the image quality can be improved. The substrate as described above can be prepared by forming a mixed melt of a thermoplastic resin and a filler comprised of inorganic pigment, a high polymer or the like, which high polymer is incompatible with the thermoplastic resin, into a one-layer or multi-layer film by a melt extruder, and drawing the formed film uniaxially or biaxially. In this case, a void ratio is determined based on selection of the resin and the filler, a mixing ratio, a drawing condition, and the like.

The above-described thermoplastic resin preferably may be polyolefin resin such as polypropylene, and polyethylene terephthalate resin due to excellent crystalline property, drawing property, and facilitation of void formation. Preferably, the polyolefin resin or polyethylene terephthalate resin is used as a principal component and a small amount of other thermoplastic resin material is used together according to circumstances. The inorganic pigment used as the above-described filler preferably has an average grain size of 1 to 20 µm, and calcium carbonate, clay, diatomaceous earth, titanium oxide, aluminum hydride, silica, and the like can be used. Further, when polypropylene is used as the thermoplastic resin, polyethylene terephthalate which is an incompatible resin used as the filler is preferably combined therewith.

The amount of the filler such as the inorganic pigment contained in the substrate of the image receiving sheet is generally in the range from 2 to 30% by volume.

The thickness of the substrate of the image receiving sheet is usually in the range from 10 to 400 µm, and preferably in the range from 25 to 200 µm. Further, the surface of the substrate may be subjected to surface treatment such as corona discharge, glow discharge, or the like so as to improve adhesiveness with an image receiving layer (or a cushion layer) or adhesiveness with an image forming layer of a heat transfer sheet.

At least one image receiving layer is provided on the surface of the image receiving sheet so that the transfer material is transferred from the transfer layer and is fixed to the image receiving sheet. The image receiving layer is preferably formed with an organic polymer binder as a main component. The above-described binder is preferably a thermoplastic resin, and examples thereof include homopolymers and copolymers of acrylic monomers such as acrylic acid, methacrylic acid, acrylic ester, or methacrylic ester, cellulose based polymers such as methyl cellulose, ethyl cellulose, or cellulose acetate, homopolymers and copolymers of vinyl based monomers such as polystyrene, polyvinyl pyrolidone, polyvinyl butyral, polyvinyl alcohol, or polyvinyl chloride, condensed polymer such as polyester or polyamide, and rubber based polymers such as butadiene-styrene copolymer. The binder of the image receiving layer is preferably a polymer whose glass transition temperature (Tg) is lower than 90° C. for the purpose of obtaining proper adhesive strength between the binder and the transfer material. Accordingly, a plasticizer can also be added to the image receiving layer. Further, it is preferable that Tg of the binder be 30° C. or higher for the purpose of preventing blocking between sheets. As the binder of the image receiving layer, the same polymer material as that of the binder contained in the image donating layer, or a similar polymer material is particularly preferably used from the standpoint of improving adhesiveness with the image donating layer at the time of transfer recording, and also improving sensitivity or image intensity.

The thickness of the image receiving layer is generally in the range from 0.3 to 7 µm, and preferably in the range from 0.7 to 4 µm.

It is preferable that the image receiving sheet can be adhered to the surface of the ceramic body, since even when a ceramic body having a curved surface such as a dish or a bottle, is used, the operation becomes easy. The above-described image receiving sheet may be a sheet (may be referred to as "adhesive image receiving sheet") having a structure in which a layer comprised of a water-soluble polymer (may be referred to as "water-soluble polymer layer") and an image receiving layer comprised of a hydrophobic polymer (may be referred to as "hydrophobic polymer layer") are successively formed on the substrate. As the above-described substrate, water-soluble polymer, and hydrophobic polymer, the same materials as those provided in the transfer sheet described in the first aspect, can be used, and preferred examples of the substrate of the first aspect may also be preferably used in this case as well.

As described above, the image receiving layer may also be formed on the surface of the ceramic body. When the image receiving layer is formed on the surface of the ceramic body, the transfer accelerating material is applied in an imagewise manner to at least one of the surface of the image donating layer of the image donating sheet and the surface of the image receiving layer of the ceramic body. When the image receiving layer is formed on the surface of the ceramic body, components in the image receiving layer are those as described above.

In the above-described latent image forming step, when a latent image is formed by applying the transfer accelerating material to the surface of the image donating layer or to the surface of the image receiving layer in an imagewise manner, the image donating layer permeates only at a portion of a latent image to which the transfer accelerating material is adhered, and bonding of the binder which forms the layer, is released. Further, bonding strength between the substrate and the image donating layer decreases to improve the transfer property for the image receiving sheet. As a result, transfer at a lower temperature becomes possible.

In the transfer step performed after the latent image forming step, the image donating layer is transferred to the image receiving layer in accordance with the formed latent image, and an image comprised of the image donating layer is formed on the surface of the image receiving layer. In the transfer step, the image donating layer and the image receiving layer are at least made to contact each other, and the image donating layer is transferred onto the image receiving layer only in a region in which the transfer accelerating material is provided. At the time of transfer, it is preferable to apply heat and also apply pressure. In the aspect in which the image receiving sheet is used, the transfer step can be carried out by using, for example, a pair of heating nip rollers in which heating means such as heaters are built-in.

When the above-described image receiving layer is not formed on the ceramic body, after the latent image forming step and the transfer step, an image comprised of the image donating layer formed on the image receiving sheet is disposed on the surface of the ceramic body. When a sheet in which the image receiving layer contains thermoplastic resin as the binder, is used as the image receiving sheet, the image comprised of the image donating layer can be disposed on the surface of the ceramic body together with the image receiving sheet by rendering the image receiving layer of the image receiving sheet heated and applied to the surface of the ceramic body. At the time of heat application, the image comprised of the image donating layer may be disposed so as to face the surface of the ceramic body or may be disposed with an image receiving layer interposed between the ceramic body and the image comprised of the image donating layer. When the image comprised of the image donating layer is disposed so as to face the surface of the ceramic body, a reverse image of a desired image is formed on the image receiving sheet.

Further, when an adhesive image receiving sheet having a paper substrate is used, after the latent image forming step and the transfer step, a portion of the adhesive image receiving sheet is immersed in water to dissolve a portion of polymer in the water-soluble polymer layer, and a hydrophobic polymer layer is peeled from the paper substrate. The peeled hydrophobic polymer layer is adhered to the surface of the ceramic body, and the image comprised of the image donating layer can be disposed on the surface of the ceramic body together with the image receiving layer. Moreover, when an adhesive image receiving sheet having a plastic film support is used, due to a film being subjected in advance to surface treatment for formation of a mold release layer as described above, the hydrophobic polymer layer on which an image is formed, can be peeled from the film substrate without being immersed in water. The peeled hydrophobic polymer layer can be adhered via an adhesive layer to the surface of the ceramic body such as a ceramic plate.

When the image comprised of the image donating layer and formed on the above-described adhesive image receiving sheet, is disposed on the surface of the ceramic body, the above-described image may be disposed in a reverse state in the same way as in the first aspect. The preferred structures and materials in the first aspect are also preferably used in this case as well.

Further, after the image comprised of the image donating layer and formed on an image receiving layer (that is, a layer comprised of thermoplastic resin or the like) of the non-adhesive image receiving sheet having been transferred to the image receiving layer of the above-described adhesive image receiving sheet, the adhesive image receiving sheet (that is, an adhesive sheet having a paper substrate) is, as described above, partially immersed in water, and thereafter, the paper substrate is peeled and the image comprised of the image donating layer can be disposed on the surface of the ceramic body together with the hydrophobic polymer layer.

In the above-described sintering step, the ceramic body on which the image comprised of the image donating layer is formed, is heated and the inorganic pigment contained in the image donating layer is sintered on the surface of the ceramic body. The inorganic pigment is sintered on the surface of the ceramic body, and components of the image donating layer other than the inorganic pigment, and components of the image receiving layer or the like disposed on the surface of the ceramic body together with the image, are evaporated or incinerated. Heating of the ceramic body is preferably carried out by using, for example, an electric furnace or the like from the standpoint of temperature control, coloring property, and the like. Heating conditions such as heating temperature, heating time, and the like are the same as those described in the first aspect, and preferred conditions described therein are preferably used in this case as well.

In the sintering step, components other than the inorganic pigment in the image donating layer, and components such as the image receiving layer disposed on the surface of the ceramic body together with the image are evaporated or incinerated. Accordingly, in the above-described sintering step, the materials (components in the image donating layer and components in the image receiving layer) disposed on the surface of the ceramic body together with the inorganic pigment preferably do not contain atoms or compounds which are not eliminated by evaporation or combustion in the sintering step and may not contain atoms and compounds which react with the inorganic pigment to discolor the same.

The painted ceramic body prepared by the production method according to the first to fifth aspects of the present invention, can be used, by selecting the shape of a ceramic body to be painted, and a formed image in various ways, for various application, for example, ceramics photography (portraits, funeral pictures, pictures of a pet, souvenir pictures to be kept permanently, and the like), trinkets and accessories (including mugs, liquor bottles, family crests, fish prints, and the like), and building materials (art tiles used for walls of bath room, entrance hall, living room, lobby, guest room, or the like, painted signboards, guide plates, room accessories, interior goods, and the like).

EXAMPLES

The present invention will be described with reference to examples, but it is not limited to these examples.

Example 1

[Preparation of hot melt ink]

| | |
|---|---|
| carnauba wax (manufactured by Noda Wax Co., Ltd.) | 40 parts by mass |
| fatty acid triglyceride ("K-3 WAX"; manufactured by Kawaken Fine Chemical Co., Ltd.) | 25 parts by mass |
| hydrocarbon resin ("Arkon P-100"; manufactured by Arakawa Chemical Industries Co., Ltd.) | 10 parts by mass |
| cyan inorganic pigment for ceramic (product number: 121522; manufactured by Mitsui Mining Co., Ltd.) | 25 parts by mass |

A mixture having the above-described composition was heated, kneaded, and dispersed by using an attritor (MAOISIC type; manufactured by Mitsui Mining Co., Ltd.) at 130° C. for 16 hours, and thereafter, subjected to heat and pressure filtration. The obtained product was cooled at a room temperature while being kept still to thereby prepare a hot melt ink C containing the above-described cyan inorganic pigment.

[Preparation of Image Donating Sheet]

An overcoat lacquer ("Plus size LO-170"; Goo Chemical Co., Ltd.) having methacrylate resin as a main component was applied and dried on a paper substrate having a basic weight of 100 g and also having 1.5 g/m² of gum arabic applied thereto, so as to have a dried film of 15 μm in thickness. Thus, an image donating sheet A was produced.

[Preparation of Painted Ceramic Plate]

An ink tank of a hot melt ink jet printer (type name: JOLTS01A; manufactured by Hitachi Koki Co., Ltd.) was filled with the obtained hot melt ink C, and characters and a test image were formed on the transfer sheet A. Subsequently, the transfer sheet with an image or the like formed thereon was immersed in water and a paper substrate was peeled and removed to thereby obtain a film with an image or the like being formed on a front side thereof. The obtained film was disposed so that a rear side thereof (that is, a surface with no image or the like formed thereon) faces a white tile, and then adhered to the white tile. After drying, the white tile was calcined at about 800° C. and a painted ceramic 101 having a monochrome image was obtained.

An image of the painted ceramic 101 had excellent image quality and excellent water resistance and light resistance.

Examples 2 to 4

Painted ceramics 102 to 104 each having a monochrome image were obtained in the same manner as in Example 1 except that in place of the cyan inorganic pigment for ceramic which was used for preparing the hot melt ink C, magenta inorganic pigment for ceramic (product number: 77571; manufactured by Cerdec Corporation), yellow pigment for ceramic (product number: 13651; manufactured by Cerdec Corporation), and black inorganic pigment for ceramic (product number: 14209; manufactured by Cerdec Corporation) were used to prepare hot melt inks M, Y, and K respectively.

Each of images of the painted ceramics 102 to 104 had excellent image quality, and excellent water resistance and light resistance.

Example 5

A color photographic image photographed by a digital camera was color-separated using a personal computer into cyan, magenta, yellow, and black, and a full-color ink image was formed on the image donating sheet A by using the hot melt ink C, M, Y, and K prepared by Examples 1 to 4 and also using the ink jet printer used in Examples 1 to 4. Subsequently, the image donating sheet A with the full-color image formed thereon was immersed in water and a paper substrate was peeled and removed to thereby obtain a film having a full-color image formed on the front side thereof. The obtained film was disposed in such a manner that a rear side (a surface on which no image is formed) thereof faces a white tile, and was then adhered to the white tile. After drying, the white tile was calcined at about 850° C. and a painted ceramic plate 105 having a full-color image was obtained.

The full-color image of the painted ceramic plate 105 had excellent image quality and excellent water resistance and light resistance.

Example 6

[Preparation of transfer accelerating material solution 1]

| | |
|---|---|
| 3,5-dimethyl-1-hexine-3-ol | 5 parts by mass |
| distilled water | 50 parts by mass |
| n-propyl alcohol | 45 parts by mass |

The above-described compositions were homogeneously agitated, and thereafter, filtered by a micro filter of 0.45 μm to thereby obtain a transfer accelerating material solution 1.

[Preparation of Image Donating Sheet]
(1) Preparation of Yellow Image Donating Sheet Preparation of inorganic pigment dispersing liquid Y:

| | |
|---|---|
| yellow pigment (manufactured by Cerdec Corporation; 13651) | 100 parts by mass |
| dispersing agent (manufactured by Shin-Etsu Chemical Co., Ltd.; surfynol CT-324) | 4 parts by mass |
| water | 60 parts by mass |

The above-described compositions were dispersed by an automatic mortar for three hours and an inorganic pigment dispersing liquid Y was obtained.

Preparation of coating liquid:

| | |
|---|---|
| Pigment dispersing liquid Y | 41 parts by mass |
| polyoxyethylene (n = 10) nonylphenol ether | 0.5 part by mass |

-continued

Preparation of coating liquid:

| | |
|---|---|
| (20% by mass solution) | |
| carnauba wax dispersing liquid (31% by mass, manufactured by Cyukyo Yushi; K-332) | 20 parts by mass |
| ethylene-acryl wax dispersing liquid (30% by mass, manufactured by Toho Chemical Industry Co., Ltd.; E5403B) | 14 parts by mass |
| ethylene vinyl acetate copolymer dispersion product (54% by mass, manufactured by Sumitomo Chemical Co., Ltd.; Sumika Flex 752) | 4 parts by mass |

The above-described compositions were sufficiently agitated and a coating liquid for a transfer layer was prepared.

The above-described coating liquid for an image donating layer was applied to a polyester film having a thickness of 5 μm so as to give a dried film of 2 μm in thickness, to thereby form an image donating layer. Thus, a yellow image donating sheet was obtained.

(2) Preparation of Magenta, Cyan, and Black Image Donating Sheets

A magenta image donating sheet, a cyan image donating sheet, and a black image donating sheet were prepared in the same manner as in production of the yellow image donating sheet except that in place of yellow pigment, magenta pigment (manufactured by Cerdec Corporation; 77571), cyan pigment (manufactured by Cerdec Corporation; 121522), and black pigment (manufactured by Cerdec Corporation; 14209) were used.

[Preparation of Image Receiving Sheet]

A first-layer coating liquid and a second-layer coating liquid having the following compositions were prepared.

Preparation of the first-layer coating liquid:

| | |
|---|---|
| vinyl chloride-vinyl acetate copolymer (manufactured by Nisshin Chemical Industry Co., Ltd.; Solbine CL2) | 160 parts by mass |
| ethylene-vinyl acetate copolymer (manufactured by Mitsui Du Pont Polychemicals Co., Ltd.; Elvaloy 742) | 61 parts by mass |
| polyester sebacate (manufactured by Nippon Soda Co., Ltd.; FN-G25) | 28 parts by mass |
| oligomer containing perfluoro alkyl group (manufactured by Dainippon Ink & Chemicals, Inc.; Megafac F-178K) | 4 parts by mass |
| methyl ethyl ketone | 630 parts by mass |
| toluene | 210 parts by mass |
| dimethylformamide | 30 parts by mass |
| Preparation of the second-layer coating liquid: | |
| polyvinyl butyral resin (manufactured by Denki Kagaku Kogyo K.K.; Denka Butyral #2000-L) | 16 parts by mass |
| N,N-dimethylacrylamide-butylacrylate copolymer | 4 parts by mass |
| oligomer containing perfluoro alkyl group (manufactured by Dainippon Ink & Chemical, Inc.; Megafac F-177) | 0.5 part by mass |
| n-propyl alcohol | 200 parts by mass |

The above-described first-layer coating liquid was applied to a PET film substrate having a thickness of 130 μm and dried at 100° C. and a first layer having a dried film of 20 μm in thickness was formed. Subsequently, the above-described second-layer coating liquid was applied to the first layer and dried at 100° C. and a second layer (that is, an image receiving layer) having a dried film of 2 μm in thickness was formed. Thus, an image receiving sheet was obtained.

[Preparation of Painted Ceramic Plate]

Figure 5:
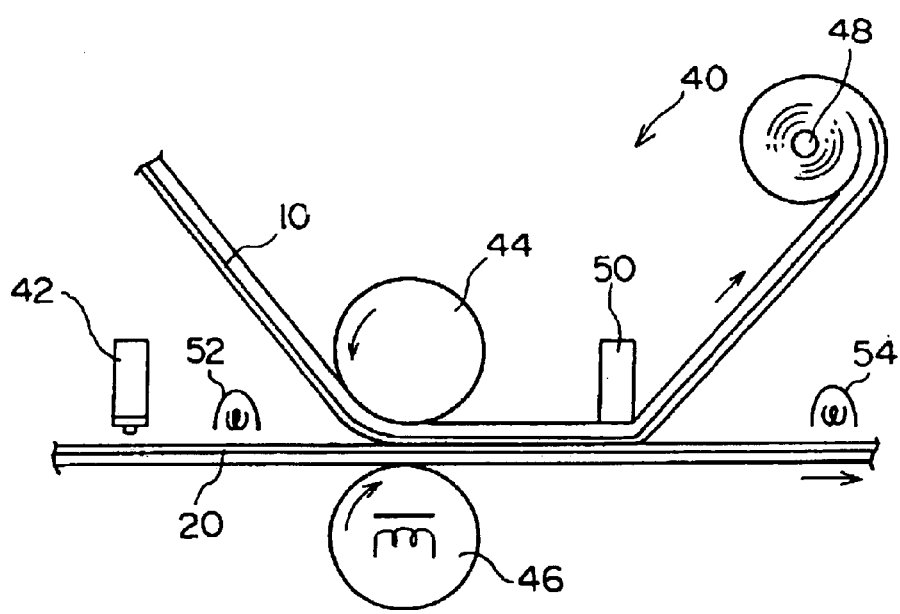
FIG. 5 is a schematic diagram of an image forming apparatus used in the embodiments of the present invention.

A full-color image was formed on the image receiving sheet by using an image forming apparatus 40 shown in FIG. 5. The image forming apparatus 40 includes a discharge head 42 which applies droplets of the transfer accelerating material solution to the surface of the second layer (image receiving layer) of the image receiving sheet 20 in an imagewise manner, a supporting drum 44, and a pinch roller 46, the latter two members conveying the image receiving sheet 20 and the image donating sheet 10 while heating and applying pressure thereto. Further, a winding roller 48 provided at the end of a conveying path of the image donating sheet 10, and a rectangular parallelopiped-shaped release bar 50 disposed further at a downstream side of the conveying path of the image donating sheet 10 than the supporting drum 44 are also provided. Moreover, a heating heater 52 which heats and dries the transfer accelerating material solution on the image receiving sheet 20 discharged in an imagewise manner, and a heating heater 54 which heats and dries a transfer image transferred onto the image receiving sheet 20, are provided in the conveying path.

The image receiving sheet and yellow image donating sheet prepared as described above were set in the image forming apparatus 40 shown in FIG. 5 and the transfer accelerating material solution 1 prepared as described above was filled in the discharge head 42. First, a yellow image was formed on the image receiving sheet. At this time, a region nipped by the supporting drum 44 and the pinch roller 46 was set to have a temperature of 75° C. The same operation was repeated by using the same image receiving sheet and each of magenta, cyan, and black image donating sheets, and a full-color image was formed on the image receiving sheet.

The surface of the image receiving sheet on which the image is formed, and the surface of a ceramic plate were made to overlap so as to contact each other and were heat-adhered to each other by a heat roller. When the image receiving sheet was peeled, an image comprised of the inorganic pigment and the second layer were separated from the image receiving sheet and adhered to the ceramic plate. A reverse pigment image was formed on the ceramic plate. Subsequently, the ceramic plate on which the above-described image comprised of the inorganic pigment was formed, was calcined at 850° C. for four hours to sinter the inorganic pigment on the ceramic plate, and a painted ceramic plate 100 was thereby prepared.

Example 7

[Preparation of Adhesive Image Receiving Sheet]

An overcoat lacquer (Plus size LD-170; manufactured by Goo Chemical Co., Ltd.) including methacrylic resin as a main component was applied and dried on a smooth paper substrate having a basic weight of 100 g and also having gum arabic of 1.5 g/m$^2$ applied thereto, so as to have a dried film of 15 μm in thickness. Thus, an adhesive image receiving sheet was produced.

[Preparation of Painted Ceramic Plate]

A full-color image was formed on the image receiving sheet, in the same manner as in Example 6, using the image receiving sheet produced in the same manner as in Example 6 and also using the image forming apparatus 40 shown in FIG. 5. The surface of the image receiving sheet with an image formed thereon, and the coated surface of the adhesive image receiving sheet prepared as described above were made to overlap and contact each other, and heat-adhered to each other using a heat roller. Subsequently, the image receiving sheet was peeled. The image formed on the image receiving sheet and the second layer were transferred onto the adhesive image receiving sheet, and the image was formed on the adhesive image receiving sheet. Subsequently, the adhesive image receiving sheet with the image formed thereon was immersed in water and a paper substrate was peeled and removed. The surface of the transfer sheet with the image formed thereon, was laid on a ceramic plate having a 2% gum arabic solution applied to the surface thereof such that they face each other, and excess water was removed by a rubber knife. Thus, the surface of the transfer sheet was closely adhered to the ceramic plate. After having been sufficiently dried, the obtained product was calcined by an electric furnace at 850° C. for four hours, and a painted ceramic plate 200 was thereby prepared.

In the painted ceramic plates 100 and 200 thus prepared, excellent full-color images having high resolution were formed, and the water resistance and light resistance thereof were excellent.

As described above, the present invention can provide a method which can produce a painted ceramic body having excellent image preservability by a simple process and at a low cost.

What is claimed is:

1. A method for producing a painted ceramic body, comprising the steps of:

preparing an image donating sheet including an image donating layer which is comprised of a painting inorganic pigment and a binder and/or a hot melt organic substance and an image receiving sheet comprising an image receiving layer to which the image donating layer is transferrable in an imagewise manner;

forming a latent image by applying in an imagewise manner a transfer accelerating material, which accelerates transfer of the image donating layer to the surface of the image receiving layer, to at least one of the surface of the image donating layer of the image donating sheet and the surface of the image receiving layer of the image receiving sheet;

transferring the image donating layer corresponding to the latent image, to the surface of the image receiving layer with at least the surface of the image donating layer and the surface of the image receiving layer contacting each other, and peeling the image donating sheet away, thereby forming an image comprised of the image donating layer on the surface of the image receiving layer;

disposing the image comprised of the image donating layer on the surface of the ceramic body together with at least a part of the image receiving sheet; and sintering the inorganic pigment included in the image donating layer on the surface of the ceramic body by heating the ceramic body.

2. A method for producing a painted ceramic body according to claim 1, wherein the image receiving sheet comprises a layer including a water-soluble polymer and an image receiving layer including a hydrophobic polymer successively formed on water-permeable substrate, and in said step of disposing, the water-soluble polymer is partially dissolved in water to peel the substrate away, and a surface of the image receiving sheet from which the substrate is peeled, or a surface opposite thereto adheres to the surface of the ceramic body, and an image comprised of the image donating layer is disposed on the surface of the ceramic body together with the image receiving layer including a hydrophobic polymer.

3. A method for producing a painted ceramic body according to claim 1, further comprising the step of transferring the image comprised of the image donating layer to other image receiving sheets after the step of transferring the image donating layer corresponding to the latent image, and prior to the step of disposing.

4. A method for producing a painted ceramic body according to claim 1, wherein the transfer accelerating material is a colorless or light-colored material.

5. A method for producing a painted ceramic body according to claim 1, wherein the image donating layer comprises a glass component.

6. A method for producing a painted ceramic body according to claim 1, wherein the binder in the image donating layer comprises an amorphous organic high molecular polymer having a softening point of 40 to 150° C.

7. A method for producing a painted ceramic body, comprising the steps of:

preparing an image donating sheet having an image donating layer which is comprised of a painting inorganic pigment and a binder and/or a hot melt organic substance, and a ceramic body having an image receiving layer to which the image donating layer is transferrable;

forming a latent image by applying in an imagewise manner a transfer accelerating material, which accelerates transfer of the image donating layer to the surface of the image receiving layer, to at least one of the surface of the image donating layer of the image donating sheet and the surface of the image receiving layer;

transferring the image donating layer corresponding to the latent image, to the surface of the image receiving layer with at least the surface of the image donating layer and the surface of the image receiving layer contacting each other, and peeling the image donating sheet away, thereby forming an image comprised of the image donating layer on the surface of the image receiving layer; and sintering the painting inorganic pigment on the surface of the ceramic body by heating the ceramic body.

8. A method for producing a painted ceramic body according to claim 7, wherein the transfer accelerating material is a colorless or a light-colored material.

9. A method for producing a painted ceramic body according to claim 7, wherein the transfer accelerating material has a surface tension of 25 to 60 mN/m and a viscosity of 50 mPa·s or less.

10. A method for producing a painted ceramic body according to claim 7, wherein the image donating layer comprises a hot melt glass component.

11. A method for producing a painted ceramic body according to claim 1, wherein the latent image is formed by spraying or ejecting the transfer accelerating material, generating ink droplets, and applying the droplets to at least one of the surface of the image donating layer of the image donating sheet and the surface of the image receiving layer.

12. A method for producing a painted ceramic body according to claim 7, wherein the latent image is formed by spraying or ejecting the transfer accelerating material, generating ink droplets, and applying the droplets to at least one of the surface the image donating layer of the image donating sheet and the surface of the image receiving layer.

13. A method for producing a painted ceramic body, comprising the steps of:

preparing an image donating sheet including an image donating layer which is comprised of a painting inorganic pigment and a binder and/or a hot melt organic substance, and an image receiving sheet comprising an image receiving layer to which the image donating layer is transferrable in an imagewise manner;

forming a latent image by applying in an imagewise manner a transfer accelerating material, which accelerates transfer of the image donating layer to the surface of the image receiving layer, to at least one of the surface of the image donating layer of the image donating sheet and the surface of the image receiving layer of the image receiving sheet;

transferring the image donating layer corresponding to the latent image, to the surface of the image receiving layer with at least the surface of the image donating layer and the surface of the image receiving layer contacting each other, and peeling the image donating sheet away, thereby forming an image comprised of the image donating layer on the surface of the image receiving layer;

disposing the image comprised of the image donating layer on the surface of the ceramic body together with at least a part of the image receiving sheet; and sintering the inorganic pigment included in the image donating layer on the surface of the ceramic body by heating the ceramic body;

wherein the step of forming a latent image by applying in an imagewise manner a transfer accelerating material to at least one of the surface of the image donating layer and the image receiving layer comprises forming the latent image by forming a toner image onto the at least one of the surface of the image donating layer and the image receiving layer using an electrophotographic printer.

14. A method for producing a painted ceramic body, comprising the steps of:

preparing an image donating sheet having an image donating layer which is comprised of a painting inorganic pigment and a binder and/or a hot melt organic substance, and a ceramic body having an image receiving layer to which the image donating layer is transferrable;

forming a latent image by applying in an imagewise manner a transfer accelerating material, which accelerates transfer of the image donating layer to the surface of the image receiving layer, to at least one of the surface of the image donating layer of the image donating sheet and the surface of the image receiving layer;

transferring the image donating layer corresponding to the latent image, to the surface of the image receiving layer with at least the surface of the image donating layer and the surface of the image receiving layer contacting each other, and peeling the image donating sheet away, thereby forming an image comprised of the image donating layer on the surface of the image receiving layer; and sintering the painting inorganic pigment on the surface of the ceramic body by heating the ceramic body;

wherein the step of forming a latent image by applying in an imagewise manner a transfer accelerating material to at least one of the surface of the image donating layer and the image receiving layer comprises forming the latent image by forming a toner image onto the at least one of the surface of the image donating layer and the image receiving layer using an electrophotographic printer.

15. A method for producing a painted ceramic body according to claim 13, wherein a toner for forming the toner image comprises a thermoplastic resin.

16. A method for producing a painted ceramic body according to claim 14, wherein a toner for forming the toner image comprises a thermoplastic resin.

17. A method for producing a painted ceramic body according to claim 13, wherein the toner image is colorless or light-colored.

18. A method for producing a painted ceramic body according to claim 14, wherein the toner image is colorless or light-colored.

19. A method for producing a painted ceramic body according to claim 15, wherein the toner image is colorless or light-colored.

20. A method for producing a painted ceramic body according to claim 16, wherein the toner image is colorless or light-colored.

* * * * *